(12) United States Patent
Malkin et al.

(10) Patent No.: US 8,893,075 B2
(45) Date of Patent: Nov. 18, 2014

(54) SCREEN USE DIAGRAM-BASED REPRESENTATION, DEVELOPMENT AND TESTING SYSTEM AND METHOD

(75) Inventors: Peter K. Malkin, Ardsley, NY (US); Stanley M. Sutton, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 13/014,210

(22) Filed: Jan. 26, 2011

(65) Prior Publication Data
US 2012/0192145 A1    Jul. 26, 2012

(51) Int. Cl.
*G06F 9/44*    (2006.01)
(52) U.S. Cl.
CPC .................................. *G06F 9/44* (2013.01)
USPC ........................... 717/104; 717/105; 717/109
(58) Field of Classification Search
None
See application file for complete search history.

(56) References Cited

U.S. PATENT DOCUMENTS

| | | | | |
|---|---|---|---|---|
| 6,070,006 | A * | 5/2000 | Iriuchijima et al. | 717/109 |
| 6,374,207 | B1 * | 4/2002 | Li et al. | 703/27 |
| 6,577,981 | B1 * | 6/2003 | Grey et al. | 702/119 |
| 6,950,802 | B1 * | 9/2005 | Barnes et al. | 705/7.22 |
| 7,042,469 | B2 * | 5/2006 | Fuller | 345/629 |
| 7,464,297 | B2 * | 12/2008 | Potter et al. | 714/38.14 |
| 7,565,613 | B2 * | 7/2009 | Forney | 715/745 |
| 7,735,062 | B2 * | 6/2010 | de Seabra e Melo et al. | 717/120 |
| 7,930,203 | B2 * | 4/2011 | Barnes et al. | 705/7.23 |
| 8,131,663 | B1 * | 3/2012 | Taylor | 717/109 |
| 8,132,146 | B2 * | 3/2012 | Renner | 717/105 |
| 8,458,648 | B2 * | 6/2013 | Dangeville et al. | 717/105 |
| 8,484,626 | B2 * | 7/2013 | Nagulu et al. | 717/136 |
| 2006/0095276 | A1 * | 5/2006 | Axelrod et al. | 717/104 |
| 2007/0061777 | A1 * | 3/2007 | Vashi et al. | 717/105 |
| 2008/0127065 | A1 * | 5/2008 | Bryant et al. | 717/109 |
| 2008/0163159 | A1 * | 7/2008 | Oara et al. | 717/104 |
| 2008/0244062 | A1 * | 10/2008 | Elangovan et al. | 709/224 |
| 2009/0083697 | A1 * | 3/2009 | Zhang et al. | 717/105 |
| 2011/0145783 | A1 * | 6/2011 | Seshan et al. | 717/105 |
| 2011/0239104 | A1 * | 9/2011 | Prasad et al. | 715/234 |
| 2012/0159427 | A1 * | 6/2012 | Oara et al. | 717/104 |
| 2014/0109037 | A1 * | 4/2014 | Ouali | 717/105 |

OTHER PUBLICATIONS

Heumann, "User experience storyboards: Building better UIs with RUP, UML, and use cases"; 2003 Rational Software; [retrieved on Jul. 11, 2013]; Retrieved from Internet <URL:https:ncisvn.nci.nih.gov/svn/caintegrator2/tags/CAINTEGRATOR2_V_!_3_|12/docs/requirements/references/user_experience_modeling.pdf>;pp. 1-17.*

Constantien, "Human activity modeling: Toward a Progratic Integration of Activity Theory and Usage-Centered Design"; 2009 Human-centered software engineering, vol. II; [retrieved on Jul. 11, 2013]; Retrieved from Internet <URL:https://link.springer.com/content/pdf/10.1007%2F978-1-84800-907-3_3.pdf >;pp. 27-51.*

(Continued)

*Primary Examiner* — Tuan Dam
*Assistant Examiner* — Xi D Chen
(74) *Attorney, Agent, or Firm* — Scully, Scott, Murphy & Presser, P.C.; Louis J. Percello, Esq.

(57) ABSTRACT

A graphical editor or the like, and methods thereof, may be provided that can represent actors associated with use cases via screens, screen flows. The actors, use cases and intermediary screens, screen flows may be all simultaneously and explicitly represented in a diagram referred to as a screen-use diagram.

25 Claims, 4 Drawing Sheets

(56) References Cited

OTHER PUBLICATIONS

Tudoreanu, et al., "Reshapeable Visualizations", 2000 IEEE; [retrieved on Jun. 30, 2014]; Retrieved from Internet <URL:http://ieeexplore.ieee.org/stamp/stamp.jsp?tp=&arnumber=897218>; pp. 245-250.*

Bischoff, et al., "The MORPHA Sytle Guide for Icon-Based Programming"; 2002 IEEE; [retrieved on Jun. 30, 2014]; Retrieved from Internet <URL:http://ieeexplore.ieee.org/stamp/stamp.jsp?tp=&arnumber=1045668>; pp. 282-287.*

Hahn, Kim, "Why Are Some Diagrams Easier to Work With? Effects of Diagrammatic Representation on the Cognitive Integration Process of Systems Analysis and design"; 2000 ACM; [retrieved on Jun. 30, 2014]; Retrieved from Internet <URL:http://dl.acm.org/citation.cfm?id=329693>; pp. 181-213.*

Bruegger, et al., "Tools for Designing and Prototyping Activity-based Pervasive Applications"; 2009 ACM; ACM; [retrieved on Jun. 30, 2014]; Retrieved from Internet <URL:http://dl.acm.org/citation.cfm?id=1821748>; pp. 129-136.*

* cited by examiner

SCREEN USE DIAGRAM-BASED REPRESENTATION, DEVELOPMENT AND TESTING SYSTEM AND METHOD

FIELD

The present application generally relates to computer systems and more particularly to computer applications that include human interaction with a computer system through a user interface.

BACKGROUND

Computer applications are widespread in society and run on computers that for example may include hardware processing elements, memory devices and other hardware physical components. Many computer applications exist to provide services to human users. These applications generally provide some "user interface" by which users interact with the computer or computer system, for example, to make requests of the system and to receive responses from the system.

Computer applications have grown tremendously in size and complexity over the history of computing. The technical discipline of software engineering (and related fields) has arisen to improve the quality and reduce the costs of developing computer applications. Software engineering researchers have devised tools and methods to help realize these goals. Among these tools and methods are ones that support the gathering, specification, and validation of software requirements in general, and of requirements relating to user interfaces in particular.

Many engineering techniques and tools use a combination of textual and graphical notations for representing software requirements. The requirements may encompass functional and nonfunctional (e.g., quality) requirements on the system under development. The requirements may also address architectural requirements on the system under development, that is, on the existing of components or elements in the system and on the relationships among these components or elements.

For example, one widely used standard for the representation of software requirements and designs is UML, the Unified Modeling Language. UML includes many different annotated graphical representations for representing aspects of a system under development, including aspects of structure, state, and behavior and relationships among these things. Processes have been proposed for the specification of software requirements and design using UML. There are no a priori restrictions on the use of UML for kinds of applications, application domains, computer systems, and others.

A use case diagram is one form of graphical representation in UML. A use case diagram may represent a conceptual space that includes systems, use cases, and actors. An "actor" corresponds to a system user. A "use case" is a textual description of user interactions with the system. A use case diagram may show system boundaries represented as attributed boxes; these may contain use cases. A use case diagram also may show use cases and actors by distinctive iconic representations. A use case diagram further may show associations between system boundaries, use cases, and actors, in the form of lines connecting them. The associations can be interpreted in various respects, for instance, an association between an actor and a use case is typically interpreted to mean that the actor participates in a use case, and an association between one use case and another may be interpreted to mean that one use case references another. If a use case is represented within a system boundary, the interpretation is that the use case is a use case of the system, that is, that the use case describes a user interaction with that system. In this way, a use case diagram can show the prospective system, the use cases of the system, the users of the system, and the occurrence of relationships (associations) among them.

UML also has representations relating to user interfaces. User interface (UI) sketches may be used to show what a particular graphical user interface looks like, e.g., in terms of images, features for entering data, controls for navigating, and others. Screen flows may be used to show sequences of UI sketches that represent changes in the user interface as a user interacts with the system. Storyboards are a combination of text and screen flows, where the text may be used to describe the behavior that is represented by the screen flow and the UI sketches in the flow. There are other ways of representing user interfaces and other commercial products that allow a software developer to specify, design, prototype, and validate user interfaces.

The inventors in the present disclosure have noted, however, that what is missing in the previous and existing work, is a representation like that of UML use-case diagrams that shows systems, actors, and UI screens and screen flows and that also shows the associations among these items or elements.

BRIEF SUMMARY

A method for providing screen use diagram-based representation, in one aspect, may include obtaining one or more instances of actors, one or more instances of screens, and one or more instances of use cases representing a system. The method may also include representing each of said one or more instances of actors, said one or more instances of screens, and said one or more instances of use cases in a screen-use diagram. The method may further include creating one or more associations between said one or more instances of actors and screens in the screen-use diagram, and creating one or more associations between said one or more instances of screens and use cases in the screen-use diagram.

A system for providing screen-use diagram based representation, in one aspect, may include a graphical editor operable obtain one or more instances of actors, screens, and use cases representing a system. The graphical editor may be further operable to represent each of said one or more instances of actors, screens, and use cases in a screen-use diagram. The graphical editor may be also operable to create one or more associations between said one or more instances of actors and screens in the screen-use diagram, and create one or more associations between said one or more instances of screens and use cases in the screen-use diagram.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
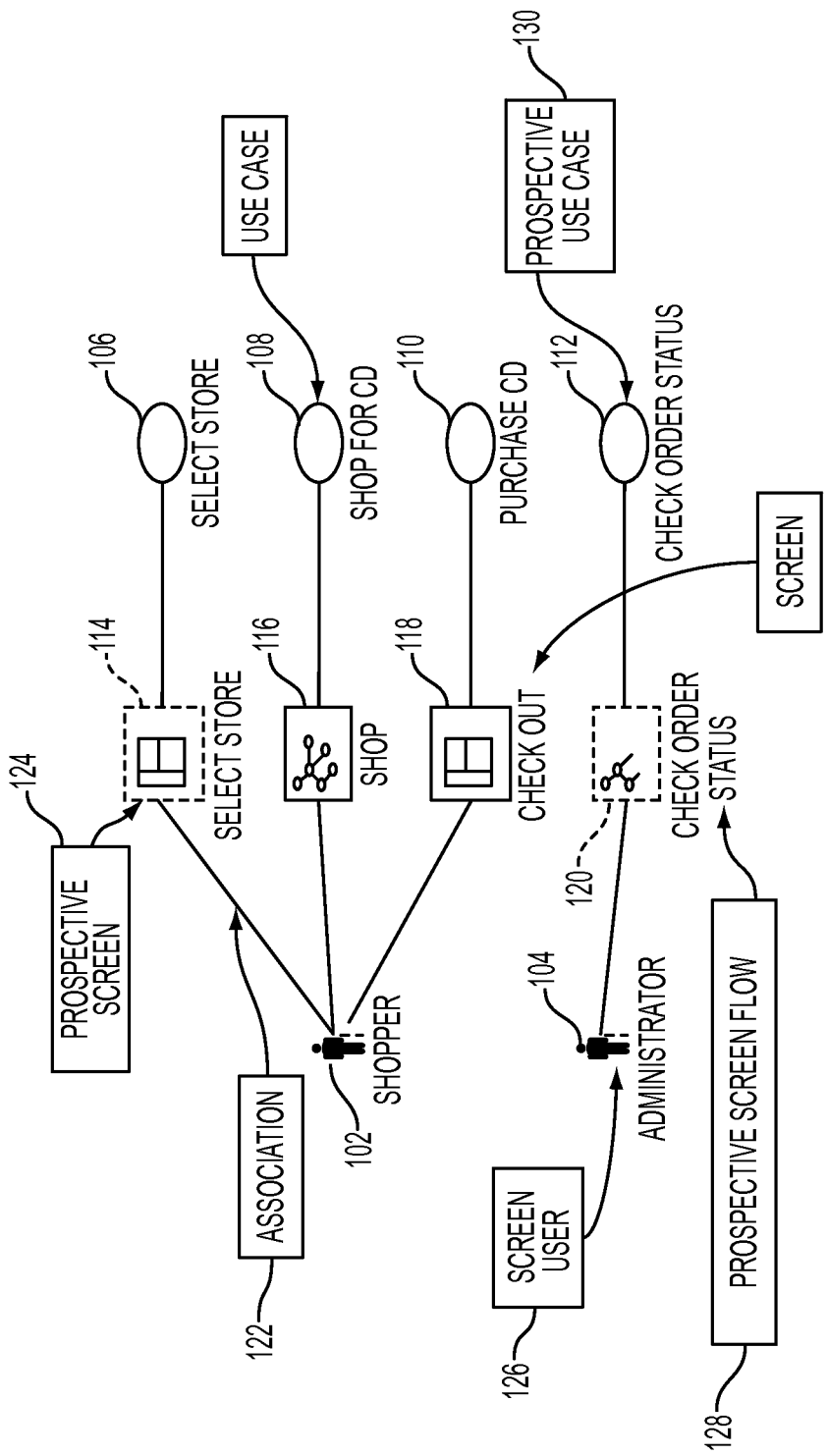
FIG. 1 illustrates an example screen-use diagram in one embodiment of the present disclosure.

The present disclosure in one embodiment introduces a screen-use diagram as a new type of diagram, one that allows for the representation of new combinations of items, and the ability to represent associations between items of these kinds.

One of the kinds of items that can be represented on a screen-use diagram is a screen. A screen may be a manifestation of a user interface in one aspect, for example, wherein the user interface may provide one or more user-visible displays of (or involved in) a system under design, development or consideration, and/or the user interface may provide user manipulable controls for a system under design, development or consideration, for instance, for interacting with the system.

A screen may be described, modeled, specified, or otherwise represented by various means, including graphical, textual, numerical, and/or other means, and/or by combinations of means.

The kind of information about a screen that may be described, modeled, specified, or otherwise represented may include aspects of its appearance, such as graphical, textual, numerical, and/or other elements. The information may also include the relative and/or absolute positions of these elements, and/or other aspects of their appearance (such as color and/or size) and/or layout (such as alignment or overlap). The kind of information about a screen that may be described, modeled, specified, or otherwise represented may include aspects of its logic, function, operation, and behavior, for example, in effects automatically produced by the user interface, such as the displaying of images in a dynamic sequence and, for example, in the effects achieved by the user manipulation of controls found in the user interface. The kind of information about a screen that may be described, modeled, specified, or otherwise represented may include information about static and/or dynamic properties of the user interface, for example, measures of the graphical complexity of the user interface or measures of the performance of controls in the user interface.

A screen may be embodied in a single artifact or by a group of associated or related artifacts. These artifacts may include documents, files, objects, or any other information-carrying representations suitable for use in the system and methodology of the present disclosure as described below.

A user interface sketch may be one instance of a screen that includes a graphical representation of a user interface display and that might be stored as a textual document in a file on a computer system.

One of the kinds of items that can be represented on a screen-use diagram is a screen-flow. A screen flow is a sequence of screens, where a user that is interacting with one screen in the sequence can navigate to the next screen in sequence (if there is a next screen). To navigate from one screen to another is to perform some operation in the first screen, such as using a computer mouse to click on a hypertext link or to hit a key on a computer keyboard so as to press a graphical button, that has the effect of bringing the second screen to the foreground or otherwise making the second screen visible and accessible to the user.

A screen flow may be described, modeled, specified, or otherwise represented by various means, including graphical, textual, numerical, and/or other means and/or by combinations of means.

In one embodiment, the information that is modeled, specified, or otherwise represented as a screen flow includes the screens that are part of the screen flow and an indication of the order in which the screens are sequenced in the screen flow.

A screen flow may be embodied in a single artifact or by a group of associated or related artifacts. These artifacts may include documents, files, objects, and/or any other information-carrying representations as described below.

A screen-flow may be represented in a screen flow-diagram as a series of screens, for example, wherein the screens are represented by icons and connections between the screens are represented by directed lines (e.g., arrows), and wherein the screen-flow diagram might be stored as a textual document in a file on a computer system.

In one aspect of the present disclosure, a system and method (e.g., including a graphical user interface (GUI) or a graphical editor or another computer module or software and methods thereof) may be provided that can represent actors associated with use cases via user interfaces, where the actors, use cases and intermediary user interfaces may be all simultaneously and explicitly represented, and where the user interfaces may be represented by screens and/or screen flows. Such a graphical depiction or representation is referred to as a screen-use diagram. In particular, a method of the present disclosure in one embodiment may allow for the association of screens and screen flows to systems under design, where the system under design is intended to produce and support those screens and screen flows, and may allow for the association of actors to screens and screen flows, where the actors are intended to interact with the screens and screen flows and, through them, with the underlying system. Actors may be the users of the system under development represented on a use-case diagram or screen-use diagram.

A screen-use diagram of the present disclosure in one embodiment includes one or more user interfaces, e.g., represented by screens and/or screen flows, as intermediaries between one or more actors and one or more use cases, and provides an explicit graphic representation. This graphical representation also may enable exploration of the diagrammed or represented components, e.g., actors, screens, screen flows, associations, use cases and system boundaries. The system and method of the present disclosure may have applicability in tools, processes, methods, and projects for the development of computer applications that entail human interaction with a computer system through a user interface. This applicability may pertain to computer applications without restriction in other respects, such as application domain, hardware and software technology used to implement the computer system, the number of actors, hardware and software components, and user interfaces involved, and technology for representation of the user interface. In one aspect, a system and method of the present disclosure also may support the drawing (creating) and use of a screen-use diagram.

FIG. 1 illustrates an example screen-use diagram in one embodiment of the present disclosure. Use cases (e.g., 106, 108, 110, 112) are actions performed by a system. Actors 102, 104 represent people, organization or others that interact with a system that is under design, development or analysis. The system under design, development or analysis may be any application, software system, physical system or device, or others. The system shown in FIG. 1 illustrates an example of an on-line shopping system. For instance, actors such as a shopper and administrator 102, 104 interact with the on-line shopping system, which perform the uses cases such as selecting a store 106, shopping for an item 108, purchasing an item 110 and checking order status 112. The actors 102, 104 may use the screens or displays 114, 116, 118, 120 (e.g., as intermediary components) for causing the system to perform one or more use cases (e.g., 106, 108, 110, 112). The GUI (or a graphical editor or the like) of the present disclosure, in one embodiment, may allow system developers or the like or others designing or analyzing the system, to create and view such screens and associate the screens with the actors and/or use cases. Associations 122 may be created to link an actor 102 to one or more screens (114, 116, 118). Associations may be also created to link one or more screens to one or more use cases (e.g., associations link 114 and 106, 116 and 108, 118 and 110). The example shown in FIG. 1 also has an actor 104 associated with a user interface screen 120, a user interface screen 120 associated with a use case 112. In one aspect, a graphical editor or an authoring tool may be used to create one or more actors, screens, screen flows, and use cases and create associations on the screen-use diagram. For instance, associations may be created graphically by drawing a line from one item (e.g., an actor) to another (e.g., a screen).

A screen-use diagram may have prospective items and/or non-prospective items. For instance, a use case may be a prospective use case; a screen may be a prospective screen; a screen flow may be a prospective screen flow. Prospective items are those that have not been created yet. For instance, a prospective screen 124 refers to a placeholder for a screen specification that has yet to be created. A prospective screen flow 128 refers to a flow of one screen to another that has not yet been created. A prospective use case 130 refers to a use case specification that has yet to be created.

The non-prospective items are those that have been given a representation that is independent of the screen-use diagram and that will continue to exist even if the screen-use diagram is deleted, which is not true of the prospective items, which may only exist as placeholders in the diagram. The non-prospective items may be created by a graphical editor that is similar to the one for screen-use diagrams or by other means. It may also be possible to create the non-prospective items using the same graphical editor as the one for screen-use diagrams, e.g., by using the editor to create a prospective item, then invoking a function in the editor to instantiate (that is, create a separate representation for) the item. Graphical editors could be built to function either way (or others). The methodologies of the present disclosure may apply to both the prospective and non-prospective items.

A screen-flow by itself does not provide information about the actors that may use the screens. The screen-use diagram of the present disclosure allows the association of screen flows and actors to be made explicit. Using a screen-use diagram, a screen-flow may be associated to one actor, a set of actors, or all actors, according to the desired use of the system under development. In one embodiment, a screen and/or screen flows may be part of a user interface.

Generally, a user interface is the part of a system, software or an application, through which a user interacts with the system, the software or the application. Screens are the visible part of the user interface—what the user sees and operates on. A user interface may include one or more screens, which represent the implementation of the user interface. Most user interfaces have more than one screen, in which case there is typically an operational flow between the screens. For example, a user may push a graphical button or click on a link in one screen and in response the system (or the software or application) may display another screen. A screen flow diagram is a pictorial representation of this screen flow. This diagram shows associations between two or more screens. The screens and associations may be represented in various ways. The associations show the paths along which users can move between screens when interacting with the user interface.

In general, items such as actors, screens, screen flows, user interfaces, and use cases may exist as separate, independent representations. Those items are referred to in this disclosure also as artifacts. They may be represented as specifications that are written in a special-purpose or general-purpose specification language and that are stored in file. They may be represented as data that are stored in tables in a database. They may be represented as objects that are instances of classes defined in an object-oriented programming language. They may be represented in other ways. On the screen-use diagrams, they may be illustrated iconically (as icons), for example, as graphical elements, textual elements, or a combination of those. The screen-use diagram allows associations between these items to be specified independently of the items themselves. That enables users/developers to change the associations without affecting the items.

The contents of a screen-use diagram may be stored in computer memory or storage and retrieved for display, use and/or updates. For example, screen-use diagrams and the elements in the screen-use diagrams (e.g., actors, screens, screen flows, use cases) and their associations may be represented internally in a computer memory as specifications that are written in a special-purpose or general-purpose specification language and that are stored in file, as data that are stored in tables in a database, as objects that are instances of classes defined in an object-oriented programming language, or in combination of those, or in other ways.

The icons on the screen-use diagram may be also references to the separate artifacts. For example, the screen-use diagram may be displayed on a computer display device via a graphical editor or a user interface software, and the icons/elements shown on the screen-use diagram may be hyperlinked to a data structure or the like that is the independent representation of the hyperlinked icon. Selecting and clicking, and/or performing other operations on the hyperlinked icon may open and show the information stored in the representation.

Figure 2:
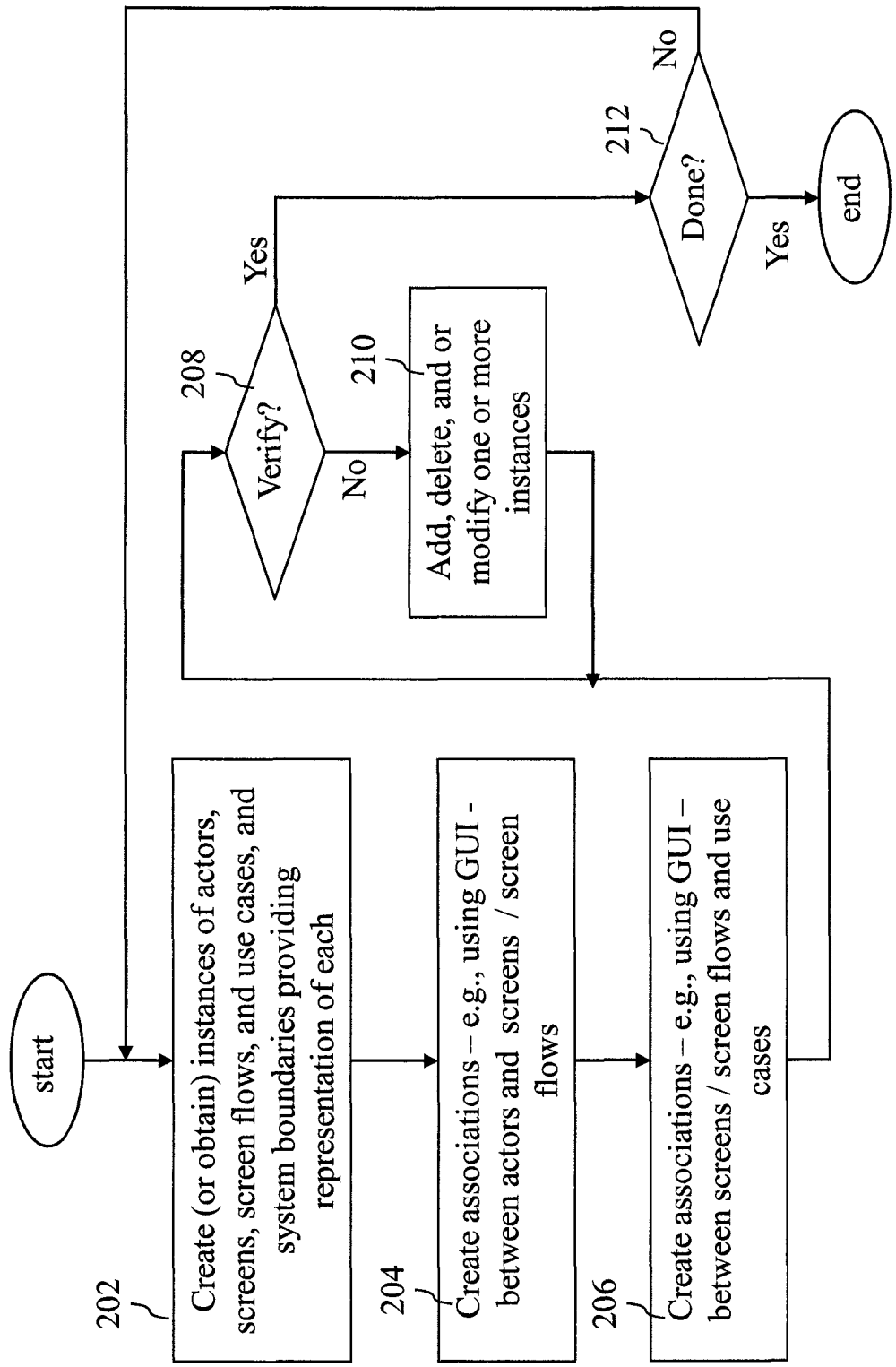
FIG. 2 illustrates a design method for creating a screen-use diagram in one embodiment of the present disclosure.

FIG. 2 illustrates a design method for creating a screen-use diagram in one embodiment of the present disclosure. At 202, instances of one or more actors, one or more screens, one or more screen flows, one or more use cases, and/or system boundaries may be created or obtained that provide graphical representation of each. A screen-use diagram need not contain all of those elements. For instance, a screen-use diagram may have a screen, a screen flow, or combinations thereof, which may serve as an intermediary between an actor and a use case. In one embodiment, a requirements analyst may develop such artifacts for a system under design or development.

At 204, a screen-use diagram may be developed to show the associations of previously identified systems, screens and screen flows, actors and use cases. A requirement analyst, for example, may develop the associations. For example, associations may be created using a GUI or a graphical editor, between actors and screens. Associations may be created between actors and screen flows. On a presentation device such as a computer monitor with a graphical display, a line may be drawn graphically or visually between components to denote associations between the components. Other methods for linking components may be used to create and view an association.

Similarly, at 206, associations between one or more screens and one or more use cases may be created using a GUI or a graphical editor in one embodiment. Associations between one or more screen flows and one or more use cases may be created.

At 208, validation checks may be performed. Examples of validation checks may include, but are not limited to, checking for the consistency, correctness, and completeness of individual screen-use diagrams; for the mutual consistency, correctness, and completeness of groups of screen-use diagrams; for the mutual consistency, correctness, and completeness of screen-use diagrams and other types of artifacts, including represented systems, screens and screen flows, and users. The checking may be done automatically by a computer software tool or even manually by an analyst or others. Some examples of validation rules are described further below.

At 210, the elements of the created screen-use diagram may be modified, for example, added, deleted and/or otherwise updated. Also in subsequent development activities, the screen-use diagrams may be used to guide software design and implementation in the following ways, although not limited to only those ways. For example, the diagrams can indicate the screens and screen flows that are to be designed and implemented for each system under development; The diagrams can indicate the operational connections between screens and screen flows of different systems under development or used with the systems under development; The diagrams can be used to indicate the need for, and to plan the testing of, screens, and systems by associated categories of user, including GUI testing and functional testing, among others.

At 212, if the creation of the instances and associations are done as desired, the process returns, otherwise, the process continues to 202, where more instances and associations may be created.

Figure 3:
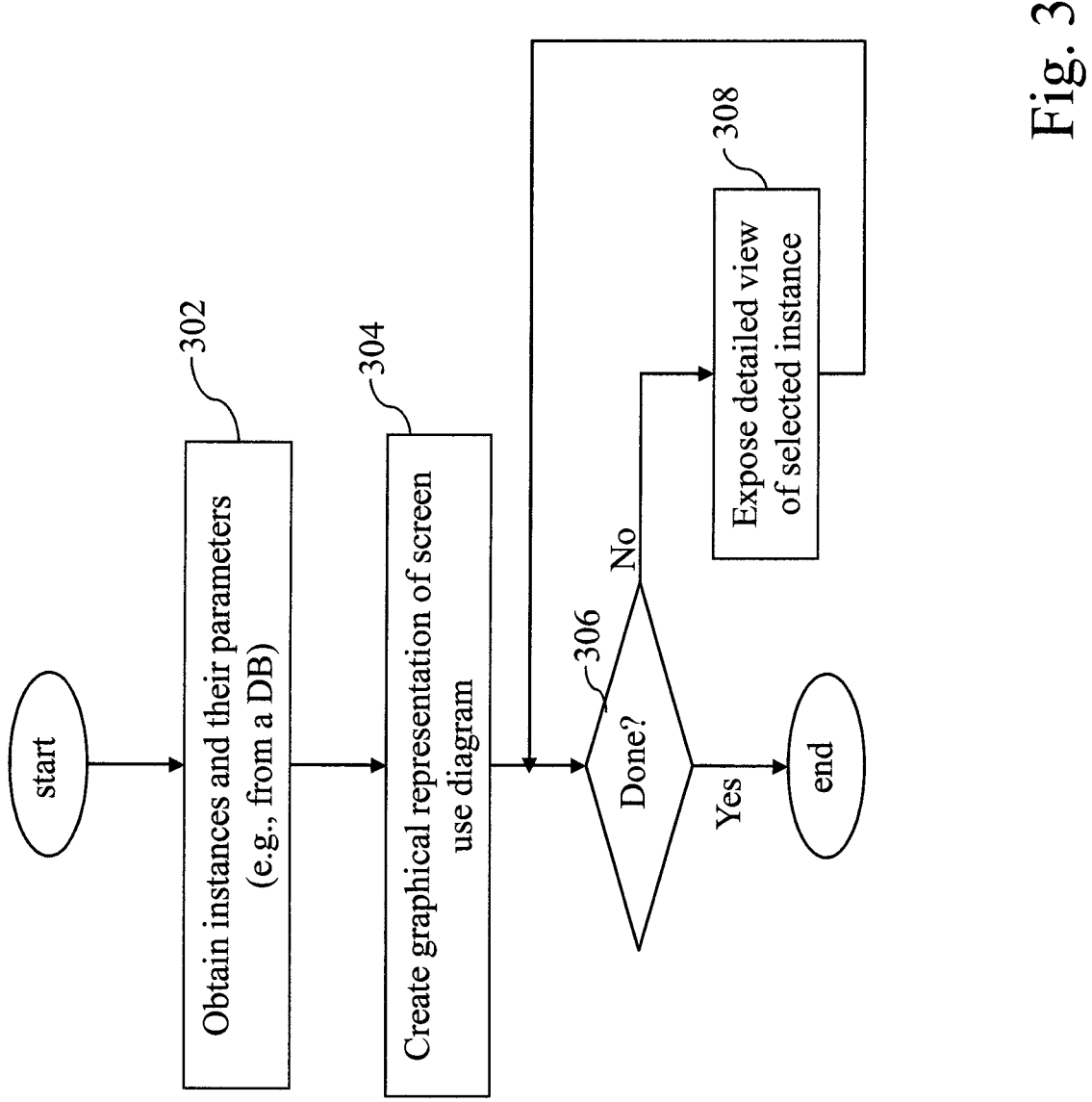
FIG. 3 illustrates a usage method for using a screen-use diagram in one embodiment of the present disclosure.

FIG. 3 illustrates a usage method in one embodiment of the present disclosure, which shows how a screen-use diagram (e.g., created according to the method shown in FIG. 2) may be used. At 302, the artifact instances of a system or application under design, development, and/or analysis is obtained. For example, users, UI, screens, screen flows, associations, use cases and/or other components are obtained from a database or the like storing the information. At 304, graphical representation of screen-use diagram is created. In one embodiment, UML diagram notations are used to draw graphical representation. At 306, if the creating of the screen-use diagram is done, the process returns. Otherwise at 308, detailed views of selected instances are exposed.

The system of the present disclosure in one embodiment is an automated system that supports the drawing and storage of screen-use diagrams, that is, diagrams that contain instances of representations of systems, screens and screen flows, use cases, actors and representations of associations among these. An example of a screen-use diagram is shown in FIG. 1. The system of the present disclosure in one embodiment may also support the representation and storage of other artifacts for specifying system requirements, including (but not limited to) representations of system descriptions, representations of UI screens and screen flows, use cases and actors. The system of the present disclosure in one embodiment may also support the implicit or explicit linking or association of entities represented in a screen-use diagram and corresponding artifacts that are stored in the system of the present disclosure. For example, the system of the present disclosure in one embodiment may maintain an association between the representation of a user (actor) on a screen-use diagram and a separate document that describes the user (actor).

The system of the present disclosure may also support actions that allow a user of the system of the present disclosure to indicate by some means an element on a screen-use diagram and thereby identify, navigate to, open, view, list, select, or otherwise access or operate on a corresponding artifact. This may be done, for instance, using an input device or pointing device such as a mouse that moves a screen cursor to the selected item. For example, the system of the present disclosure may allow a user to select the representation of a UI screen on a screen-use diagram and thereby open a separate artifact that represents the UI screen in a UI-screen editor.

Conversely, the system of the present disclosure in one embodiment may allow a user to indicate by some means an artifact in the system and thereby identify, navigate to, open, view, list, or otherwise select or operate on screen-use diagrams that contain a representation of the indicated artifact. For an example of the converse case, the system of the present disclosure in one embodiment may allow a user, by means of various widely used gestures and operations with a computer mouse, to select and open a directory of system description documents, then to select one or more of the documents in the directory, then to obtain a menu of actions that apply to such documents, then to choose an action that will allow editing, viewing, or other operations on one or more of the screen-use diagrams that contain representations of the selected documents, where those operations may specifically include operations on the representations in the screen-use diagrams of the selected documents.

The system of the present disclosure in one embodiment may also support the checking of validation rules for screen-use diagrams, including rules applicable to individual diagrams, rules applicable to groups of diagrams, and rules applicable to diagrams and linked or associated artifacts of other types, for example, as described above with reference to FIG. 2.

Examples of such rules, among others, may include a) a rule that says that every screen-use diagram must contain at least one application system, one screen or screen flow, one use case and one actor; b) a rule that says that the elements that are represented on one screen-use diagram should not be a subset of the elements that are represented on another screen-use diagram; and c) a rule that says that every actor that is represented by a separate artifact in the system of the present disclosure in one embodiment should have a corresponding representation on at least one screen use case diagram in the system.

The system of the present disclosure in one embodiment may also support the notification of users of problems identified through the evaluation of validation rules for screen-use diagrams. These notifications may include, among others, the display or other output of problem reports, the display, annotation, or highlighting of problematic diagrams or artifacts of other types, and the display, annotation, or highlighting of attributes or elements on or in the diagrams and artifacts of other types.

The system of the present disclosure in one embodiment may also support the automated repair of problems identified through the evaluation of validation rules for screen-use diagrams. The means of repair may include the addition, removal, or updating of diagrams and artifacts of other types, and the addition, removal, or updating of elements on or in the diagrams and artifacts of other types. For example, if there is a rule that says that all user representations on screen-use diagrams must be associated with a separate user-description document, and a particular user-description document is deleted from the system, then any user-representations on screen-use diagrams that corresponded to the removed user-description document must be removed from the diagrams.

Figure 4:
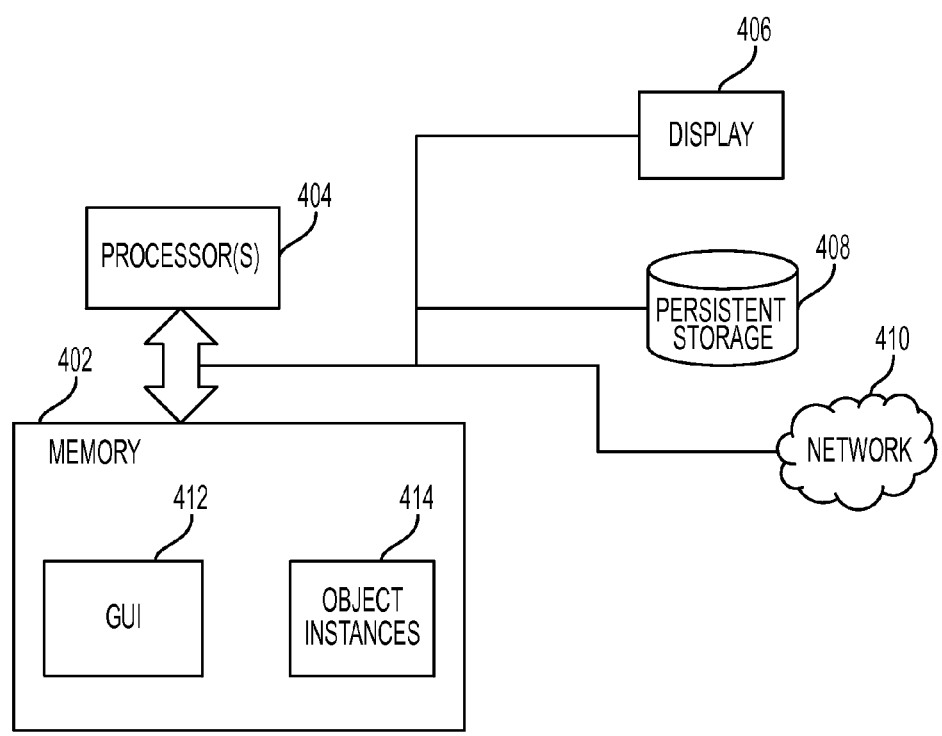
FIG. 4 is a system diagram illustrating components of a system of the present disclosure in one embodiment.

FIG. 4 is a system diagram illustrating components of a system of the present disclosure in one embodiment. A GUI 412 of the present disclosure may be loaded into memory 412 and executed by one or more processors 404. A processor 404 operable to run the GUI 412 of the present disclosure may include logical functional units and registers. The GUI 412 in one embodiment creates and validates artifact instances 414 of a system being developed, e.g., actors, user interfaces, screens and screen flows, and others as designed by a developer. Using the created instances 414, GUI 412 of the present disclosure in one embodiment generates screen-use diagrams, and for example, presents them via presentation device, e.g., a display device 406. Other presentation mechanisms may be utilized. A developer or the like user may add and/or delete and/or otherwise modify the generated screen-use diagrams. In another aspect, the created instances of the artifacts may be stored in persistent storage 408 local or remote to the processor executing the GUI 412. Thus, the processor(s) may be further connected to a network 410. An input device 416 such as a mouse or keyboard or others, may be used for inputting data or interacting with the GUI 412.

In another aspect, a screen-use diagram that has been created may be modified or updated (e.g., elements and associations on the diagram may be added, deleted, or changed). For instance, to add elements to a screen-use diagram that has been created, an existing screen-use diagram may be selected and populated with items and associations. Actual instances of items representing the system under development ("system"), user-interface screens, user-interface screen flows, system users ("actors"), and use cases may be created and used to populate the selected screen-use diagram. These items, in one aspect, are the canonical kinds of items that may be represented on a screen-use diagram and with respect to which a screen-use diagram is defined. These items may be considered "actual" in that they have a representation that exists independently of any diagrams on which they may be represented. To populate the selected screen-use diagram, representations of actual items may be added to the screen-use diagram. The representations may include graphical elements, textual elements, or a combination of these, for example, icons, labels, or icons with labels. The representations may designate or otherwise indicate or be associated to the actual items for which they stand. The selected screen-use diagram also may be populated by adding representations of prospective items on the screen-use diagram. Those representations referred to as prospective items do not have any corresponding actual items. The selected screen-use diagram may be further populated by creating actual items corresponding to the representation of prospective items that are on the screen-use diagram. Creating actual items corresponding to the representation of prospective items converts these representations of prospective items to be representations of actual items. Populating the selected screen-use diagram may also include associating actual items with representations of prospective items that are on the screen-use diagram, in effect converting these representations of prospective items to be representations of actual items. The above-described actions for populating a screen-use diagram may be performed in any order and any number of times.

In another aspect, an existing screen-use diagram may be selected on which to add associations between items. The selected screen-use diagram should have items between which associations can be added. Then, associations may be added between items on the selected screen-use diagram. For example, on a selected screen-use diagram, an association from the representation of an actor to the representation of a screen may be added; an association from the representation of an actor to the representation of a screen flow may be added; an association from the representation of a screen to the representation of a use case may be added; an association from the representation of a screen flow to the representation of a use case may be added; an association from the representation of a use case to the representation of a system may be added; an association from the representation of a screen to the representation of a system may be added; an association from the representation of a screen flow to the representation of a system may be added. The adding of the above-described associations may be repeated in any order and any number of times.

Associations between items may be represented in any effective way, for example, by a line that connects the associated items and by a box (or other graphical container) that groups the associated items and by the introduction of a new graphical symbol that represents the association and that somehow references the associated items such as by lines and schematic arrows. Any other representation for the association may be utilized and the present disclosure does not limit the methodology to any particular method of representing the associations.

In another aspect, an existing screen-use diagram may be selected from which to remove elements or associations. For instance, on an existing screen-use diagram that contains one or more elements, such as representations of actors, systems, use cases, screens and screen flows, one or more of these existing elements may be selected and removed from the diagram. Similarly, on an existing screen-use diagram that contains one or more elements, such as representations of actors, systems, use cases, screens and screen flows, and that also contains associations between these elements, such as between an actor and a screen or between a screen and a use case, one or more of these associations may be selected and removed from the diagram. In another aspect, the removal of one or more elements or associations from a screen-use diagram may imply or entail the removal of one or more additional elements or associations from the screen-use diagram. For instance, if a screen-use diagram contains a representation of an actor, a representation of a screen, and an association between this actor and this screen, then the removal of the representation of the actor may imply or entail the removal of the association to the screen. In another aspect, the removal of one or more elements or associations from a screen-use diagram may have no implications or entailments for elements or associations that remain on the screen-use diagram. For instance, if a screen-use diagram contains a representation of an actor, a representation of a screen, and an association between this actor and this screen, then the removal of the representation of the actor does not imply or entail the removal of the association.

In another aspect, an existing screen-use diagram may be selected on which to change elements or associations. In one aspect, the placement of elements and associations on the screen-use diagram may be changed. In one aspect, any labels or annotations that may apply to the elements or associations on the screen-use diagram may be changed, added, or removed. In one aspect, the specific forms and styles of representations for elements and annotations on the screen-use diagram may be changed. In one aspect, associations between pairs of elements on the screen-use diagram may be changed so as to connect different pairs of elements on the screen-use diagram. In other aspects, other changes to the diagram or to the elements and associations on the diagram may be made.

In the process of creating and/or updating a screen-use diagram, e.g., as described in the above text or illustrated in FIG. 2, validation may be performed at any point in the process. For instance, validation may be performed before or after any of the actions described above for the adding, deleting, or updating of an element or association on a screen-use diagram. For instance, validation may occur at any of the steps in FIG. 2 where a decision is made whether to reiterate or continue. Validation can be performed manually or automatically by a computer process. Manual validation may involve someone inspecting one or more diagrams or other artifacts and assessing whether they satisfy relevant validation rules. Automatic validation may include a computer program performing the inspection of the diagrams and/or other artifacts and the comparison to the validation rules.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of providing screen use diagram-based representation, comprising:
   obtaining one or more instances of actors, one or more instances of screens, and one or more instances of use cases representing a system;
   representing each of said one or more instances of actors, said one or more instances of screens, and said one or more instances of use cases in a screen-use diagram;
   creating one or more associations between said one or more instances of actors and screens in the screen-use diagram; and
   creating one or more associations between said one or more instances of screens and use cases in the screen-use diagram,
   wherein the screen-use diagram is further capable of presenting one or more prospective items, said one or more prospective items representing placeholders for specification of one or more of actors, screens or use cases not yet created,
   wherein the one or more instances of actors, the one or more instances of screens, and the one or more instances of uses cases have respective computer-implemented data representations that exist independently of the screen-use diagram, wherein the respective computer-implemented data representations that exist independently of the screen-use diagram continue to exist even if the screen-use diagram representing said one or more instances of actors, said one or more instances of screens, and said one or more instances of use cases is deleted, wherein said one or more associations between said one or more instances of screens and use cases in the screen-use diagram are specified in the screen-use diagram independently of said respective computer-implemented data representations.

2. The method of claim 1, wherein the step of obtaining includes creating said one or more instances of actors, said one or more instances of screens, and said one or more instances of use cases, to exist separately from screen-use diagram as said computer-implemented data representations.

3. The method of claim 1, wherein said one or more instances of screens include one or more instances of screen flows.

4. The method of claim 3, wherein the obtaining further includes creating said one or more instances of screen flows.

5. The method of claim 1, wherein the obtaining further includes obtaining one or more instances of systems, and the method further includes creating one or more associations between said one or more instances of use cases and said one or more instances of systems.

6. The method of claim 1, further including:
validating one or more screen-use diagrams by evaluating one or more rules, wherein the rules are applicable to individual screen-use diagrams or to one or more groups of screen use diagrams, and wherein the rules apply to properties of the screen-use diagrams or to properties of elements and associations on the screen-use diagrams, wherein the elements include representations of one or more of actors, use cases, systems, screens, and screen flows, and the associations include associations between the elements.

7. The method of claim 1, wherein the screen-use diagram is selected from existing screen-use diagrams, and the selected existing screen-use diagram is updated or deleted.

8. The method of claim 1, further including presenting the screen-use diagram on a display device with selectable items, wherein the selectable items include one or more of said one or more instances of actors, said one or more instances of screens, one or more instances of screen flows, one or more instances of systems, or one or more instances of use cases, or combinations thereof, wherein selecting an item from the selectable items on the screen-use diagram links to and opens an independent information storage associated with the selected item.

9. The method of claim 1, wherein the screen-use diagram further includes one or more instances of screen flows and one or more instances of systems, and wherein said one or more instances of actors, said one or more instances of screens, said one or more instances of use cases, said one or more instances of screen flows and said one or more instances of systems, each have a representation in independent information storage, and wherein selecting the independent information storage links to and opens one or more screen-use diagrams that include an item associated with said selected independent information storage.

10. A system for providing screen-use diagram based representation, comprising:
a processor;
a graphical editor operable to execute on the processor and further operable to obtain one or more instances of actors, screens, and use cases representing a system, the graphical editor further operable to represent each of said one or more instances of actors, screens, and use cases in a screen-use diagram, the graphical editor further operable to create one or more associations between said one or more instances of actors and screens in the screen-use diagram, and create one or more associations between said one or more instances of screens and use cases in the screen-use diagram, wherein the screen-use diagram is further capable of presenting one or more prospective items, said one or more prospective items representing placeholders for specification of one or more of actors, screens or use cases not yet created, wherein the one or more instances of actors, the one or more instances of screens, and the one or more instances of uses cases have respective computer-implemented data representations that exist independently of the screen-use diagram, wherein the respective computer-implemented data representations that exist independently of the screen-use diagram continue to exist even if the screen-use diagram representing said one or more instances of actors, said one or more instances of screens, and said one or more instances of use cases is deleted.

11. The system of claim 10, wherein the graphical editor is further operable to create said one or more instances of actors, screens, and use cases in the screen-use diagram, to exist separately of the screen-use diagram as said computer-implemented data representations.

12. The system of claim 10, wherein the graphical editor is further operable to obtain one or more instances of screen flows and to create one or more associations between said one or more instances of actors and said one or more instances of screen flows, and create one or more associations between said one or more instances of screen flows and said one or more instances of use cases.

13. The system of claim 12, wherein the graphical editor is further operable to create said one or more instances of screen flows.

14. The system of claim 10, wherein the graphical editor is further operable to obtain one or more instances of systems and to create one or more associations between said one or more instances of use cases and the one or more instances of systems.

15. The system of claim 14, wherein the graphical editor is further operable to create said one or more instance of systems.

16. A computer readable storage medium, excluding signal per se, storing a program of instructions executable by a machine to perform a method for providing screen use diagram-based representation, comprising:
obtaining one or more instances of actors, one or more instances of screens, and one or more instances of use cases representing a system;
representing each of said one or more instances of actors, said one or more instances of screens, and said one or more instances of use cases in a screen-use diagram;
creating one or more associations between said one or more instances of actors and screens in the screen-use diagram; and creating one or more associations between said one or more instances of screens and use cases in the screen-use diagram, wherein the screen-use diagram is further capable of presenting one or more prospective items, said one or more prospective items representing placeholders for specification of one or more of actors, screens or use cases not yet created, wherein the one or more instances of actors, the one or more instances of screens, and the one or more instances of uses cases have respective computer-implemented data representations that exist independently of the screen-use diagram, wherein the respective computer-implemented data representations that exist independently of the screen-use diagram continue to exist even if the screen-use diagram representing said one or more instances of actors, said one or more instances of screens, and said one or more instances of use cases is deleted.

17. The computer readable storage medium of claim 16, wherein the step of obtaining includes creating said one or more instances of actors, said one or more instances of screens, and said one or more instances of use cases, to exist separately of the screen-use diagram as said computer-implemented data representations.

18. The computer readable storage medium of claim 16, wherein the obtaining further includes obtaining one or more instances of screen flows, and the method further includes:

creating one or more associations between said one or more instances of actors and said one or more instances of screen flows; and creating one or more associations between said one or more instances of screen flows and said one or more instances of use cases.

19. The computer readable storage medium of claim 18, wherein the step of obtaining one or more instances of screen flows includes creating said one or more instances of screen flows.

20. The computer readable storage medium of claim 16, wherein the obtaining further includes obtaining one or more instances of systems, and the method further includes creating one or more associations between said one or more instances of use cases and said one or more instances of systems.

21. The computer readable storage medium of claim 20, wherein the obtaining one or more instances of systems includes creating one or more instances of systems.

22. The computer readable storage medium of claim 16, further including validating one or more screen-use diagrams by evaluating one or more rules, wherein the rules are applicable to individual screen-use diagrams or to one or more groups of screen use diagrams, and wherein the rules apply to properties of the screen-use diagrams or to properties of elements and associations on the screen-use diagrams, wherein the elements include representations of one or more of actors, use cases, systems, screens, and screen flows, and the associations include associations between the elements.

23. The computer readable storage medium of claim 16, wherein the screen-use diagram is selected from existing screen-use diagrams, and the selected screen-use diagram is updated or deleted.

24. The computer readable storage medium of claim 16, further including presenting the screen-use diagram on a display device with selectable items, wherein the selectable items include one or more of said one or more instances of actors, said one or more instances of screens, one or more instances of screen flows, one or more instances of systems, or one or more instances of use cases, or combinations thereof, wherein selecting an item from the selectable items on the screen-use diagram links to and opens an independent information storage associated with the selected item.

25. The computer readable storage medium of claim 16, wherein the screen-use diagram further includes one or more instances of screen flows and one or more instances of systems, and wherein said one or more instances of actors, said one or more instances of screens, said one or more instances of use cases, said one or more instances of screen flows and said one or more instances of systems, each have a representation in independent information storage, and wherein selecting the independent information storage links to and opens one or more screen-use diagrams that include an item associated with said selected independent information storage.

* * * * *